TEMPERATURE-COMPENSATED VERTICAL SWEEP CIRCUIT
Filed Dec. 30, 1963
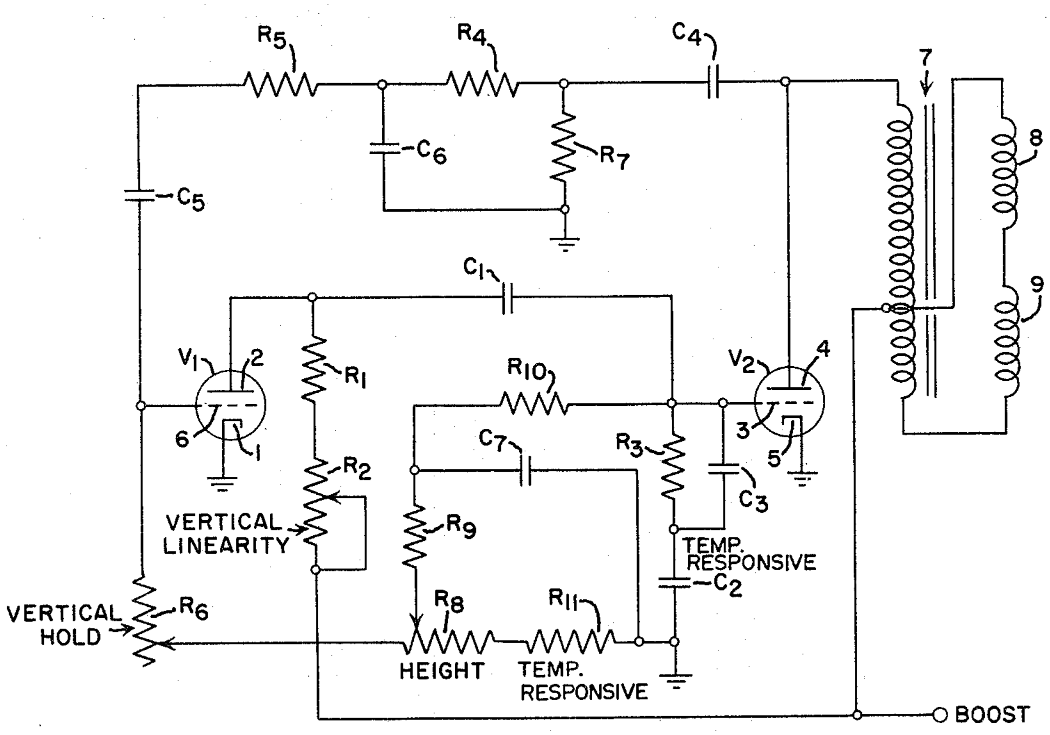
INVENTOR:
BENJAMIN O. POWELL,
BY Donald N. Timbie
HIS ATTORNEY.

United States Patent Office 3,292,107
Patented Dec. 13, 1966

3,292,107
TEMPERATURE-COMPENSATED VERTICAL SWEEP CIRCUIT

Benjamin O. Powell, North Syracuse, N.Y., assignor to General Electric Company, a corporation of New York Filed Dec. 30, 1963, Ser. No. 334,533
1 Claim. (Cl. 331—144)

The present invention relates to vertical sweep cricuits for T.V. receivers and, more specifically, to temperature-compensated vertical sweep circuits.

It is common practice to utilize a multivibrator circuit for the production of the sawtooth currents necessary for vertical deflection of the electron beam in a television picture tube. As the ambient temperature of such a multivibrator increases during receiver warm-up, corresponding increases in resistance of various components of the circuit cause a decrease in magnitude of the sweep voltage and thus in picture size. The magnitude of the sweep voltage is decreased due to the lowering of the B+ by the increased resistance of the power transformer, filter choke and output transformer and also by the lowering of the efficiency of the output transformer and deflection windings. Thus, some form of temperature compensation is necessary to prevent objectionable picture shrinkage.

Prior art approaches towards providing such compensation have not proved entirely satisfactory. One such approach utilizes a low value thermistor connected in series with the vertical windings of the deflection yoke. As the ambient temperature rises, the thermistor resistance decreases, thereby increasing the efficiency of the output stage and compensating for picture shrinkage. However, such an approach has two basic disadvantages. First, such an approach is inefficient since substantial power is consumed by the thermistor. Further, such an approach is incompatible with present high efficiency yokes which necessitate the use of very low resistance value thermistors which are presently unavailable.

Another approach towards temperature compensation utilizes a thermistor in the plate circuit of the discharge tube to thereby change the plate load impedance or preferably the operating voltage of the tube to increase the amplitude of the sawtooth coupled to the grid of the driver tube as temperature increases. Although such an approach can provide reasonably good compensation, it has been found that certain sections of the circuit exert more effect on certain portions of the raster than on others. Therefore, the use of a single compensating element in this manner provides compensation at only one portion of the raster and does not provide compensation over the complete raster.

The above prior art disadvantages have been overcome by the temperature-compensated sweep circuit of the present invention.

Accordingly, an object of the present invention is to provide an improved temperature compensated vertical sweep circuit for a television receiver.

Another object is to provide a temperature-compensated vertical sweep circuit wherein complete compensation is achieved.

These and other objects are achieved in one embodiment of the invention by the provision of a multivibrator sweep circuit employing a thermistor and a temperature-dependent capacitance to effect temperature compensaation. The thermistor is located in the bias circuit of the driver tube and serves to decrease the bias voltage at the grid of the tube as ambient temperature increases. The temperature-dependent capacitance is connected to the grid of the driver tube, the capacitance decreasing as ambient temperature increases to thereby develop an increased amplitude sawtooth wave at the grid of the driver tube. Through the use of two temperature-sensitive elements in this manner complete compensation is achieved.

The novel and distinctive features of the invention are set forth in the appended claims. The invention itself together with the further objects and advantages thereof may best be understood by reference to the following description and accompanying drawing, the single figure of which is a schematic representation of a preferred embodiment of the improved vertical sweep circuit of the present invention.

Referring to the drawing there is shown a multivibrator vertical sweep generator which is temperature compensated through the use of a thermistor and a temperature-dependent capacitance. The circuit comprises a sawtooth discharge generator tube $V_1$ having its cathode 1 grounded and its anode 2 connected to the boost supply through resistance $R_1$ and potentiometer $R_2$, resistance $R_1$ and potentiometer $R_2$ serving as load resistances for the discharge tube $V_1$. Further, the potentiometer $R_2$ serves as a vertical linearity control.

The anode 2 of tube $V_1$ is connected through coupling capacitor $C_1$ to a pulse forming network comprised of temperature-dependent capacitance $C_2$, capacitor $C_3$ and resistance $R_3$. The pulse forming network is connected to the grid of the driver tube $V_2$ and serves to develop a modified sawtooth wave at the grid 3. The tube $V_2$ is operated as a class A amplifier to reproduce the modified sawtooth at anode 4. The cathode 5 of discharge tube $V_2$ is grounded.

A feedback circuit is connected from the anode 4 of the driver tube $V_2$ to the grid 6 of the discharge generator tube $V_1$. The feedback circuit comprises serially-connected resistances and capacitances $C_4$, $R_4$, $R_5$, $C_5$ and potentiometer $R_6$ in conjunction with resistance $R_7$ and capacitance $C_6$ which are returned to ground from opposite ends of resistance $R_4$. Circuit elements $C_4$ and $R_7$, in combination, serve as a differentiator to remove the low frequency components from the modified sawtooth wave present at the anode 4 of the driver tube $V_2$ so as to provide a feedback pulse of an optimum shape. Resistances $R_4$ and $R_5$, in addition to determining the amplitude of the feedback signal, serve in conjunction with capacitor $C_6$ to prevent undesired signals from the horizontal sweep circuitry from being coupled through the vertical deflection coils to the grid 6 of discharge tube $V_1$. Capacitor $C_5$, in conjunction with potentiometer $R_6$, acts to define the free-running frequency of the multivibrator. The potentiometer $R_6$ serves as a vertical hold control which is varied to lock the multivibrator into synchronization with pulses which are coupled from the vertical integrating circuit (not shown), to the anode 2 of tube $V_1$ or the grid 3 of tube $V_2$.

A biasing circuit is connected to the grid 3 of driver tube $V_2$. The biasing circuit comprises thermistor $R_{11}$, height control potentiometer $R_8$, resistance $R_9$, resistance $R_{10}$, and capacitance $C_7$. Thermistor $R_{11}$ and potentiometer $R_8$ are serially connected between the center tap of vertical hold potentiometer $R_6$ and ground. The tap of the height control potentiometer $R_8$ is connected through resistances $R_9$ and $R_{10}$ to the grid 3 of driver tube $V_2$, the capacitance $C_7$ being utilized in connection with resistance $R_9$ as a filter to prevent coupling of the feedback signal from the grid 6 of tube $V_1$ to the grid 3 of tube $V_2$. The thermistor $R_{11}$ serves to decrease the bias on the grid 3 of tube $V_2$ when the ambient temperature increases to thereby increase the amplitude of the sawtooth appearing at the anode 4 of tube $V_2$.

A standard autotransformer 7, which serves to couple the multivibrator to the vertical deflection windings 8 and 9 of the deflection yoke, is connected in the plate circuit of the driver tube $V_2$.

Although the operation of the conventional multivibrator circuit employed in this invention is well-known, a brief summary of such operation is given to allow a better understanding of the temperature compensation achieved by the present invention. As noted, the discharge tube $V_1$ serves as a sawtooth discharge generator. The operation can most easily be understood by assuming initially that plate current of the tube $V_1$ is cut off by a negative voltage at the grid 6. The negative voltage is developed by causin gthe grid 6 to draw grid current thereby charging the capacitors of the feedback network. The negative voltage thus stored on the capacitors of the feedback network slowly leaks off through the vertical hold potentiometer $R_6$, height control potentiometer $R_8$, and thermistor $R_{11}$ to ground. During the time that the tube $V_1$ is cut off, capacitor $C_2$ and $C_3$ in the pulse forming network and coupling capacitor $C_1$ are charged in sawtooth fashion from the boost supply through vertical linearity potentiometer $R_2$ and load resistance $R_1$. By the use of the pulse-shaping network comprised of capacitances $C_2$ and $C_3$ and resistance $R_3$, a modified sawtooth is developed which is coupled to the grid 3 of tube $V_2$. The modified sawtooth voltage wave form is necessary to assure linear deflection of the cathode ray beam.

After a prescribed period, the negative voltage on the grid 6 of the tube $V_1$ leaks off to ground to such a degree that tube $V_1$ conducts slightly. At that time, the capacitors $C_2$ and $C_3$ of the pulse-shaping network and coupling capacitor $C_1$ begin to discharge through the tube $V_1$ and an abrupt current change through the autotransformer 7 begins. The current change through the autotransformer 7 is in such a direction that a positive pulse appears at the anode 4 of tube $V_2$. The positive pulse is coupled by the above-described feedback network to the grid 6 of tube $V_1$ so as to cause tube $V_1$ to become even more conductive. In this manner, a regenerative action is realized which results in a very rapid discharge of capacitors of the pulse-shaping network to complete the modified sawtooth wave form. When the pulse-shaping capacitors $C_2$ and $C_3$ are discharged, the positive pulse appearing at the plate 4 of the tube $V_2$ no longer exists and the grid current which is caused by the presence of the positive feedback pulse on the grid 6 of tube $V_1$ again allows the capacitors of the feedback circuit to charge so as to establish plate current cut off in the tube $V_1$. Thus, the sawtooth cycle again commences. From the foregoing discussion, it is seen that the frequency of oscillation of the multivibrator is inherently a function of the time required for the negative cutoff voltage at the grid 6 of tube $V_1$ to leak off and allow conduction of the tube. This length of time is controlled by adjustment of the vertical hold potentiometer $R_6$ in such a manner that the free running frequency of the multivibrator is brought close to the frequency of the arriving synch pulses so that lockin between the multivibrator and the synch pulses is effected.

The vertical linearity of the circuit is controlled by varying potentiometer $R_2$ which, as a part of the plate load of tube $V_1$, serves to define the rate at which the capacitors $C_2$ and $C_3$ charge to thereby control the sawtooth coupled to the grid 3 of tube $V_2$. Height control is effected by varying potentiometer $R_8$ to change the bias and thus the operating point of the tube $V_2$, the height control having a minimal effect on linearity since tube $V_2$ is always operated in its linear region as a class A amplifier.

In accordance with the present invention, temperature compensation of such a multivibrator sweep circuit is achieved by the action of thermistor $R_{11}$ and temperature-dependent capacitance $C_2$. As the resistance of thermistor $R_{11}$ decreases with temperature, the bias voltage tapped from the height control potentiometer $R_8$ decreases, thereby decreasing the bias at the grid 3 of tube $V_2$ and causing an increased amplitude sawtooth wave to appear at the anode 4 of tube $V_2$. In this manner, an increased amplitude sawtooth output is generated to maintain a constant picture size. However, the use of $R_{11}$ alone has been found to be insufficient to provide the desired complete compensation. In accordance with the present invention, perfect compensation is achieved by the use of the temperature-dependent capacitance $C_2$ in conjunction with the thermistor $R_{11}$. As the temperature of capacitor $C_2$ increases its capacitance value correspondingly decreases. Thus, the capacitors of the pulse forming network charge in a sawtooth fashion to a greater amplitude than exists at lower temperatures. The increased amplitude sawtooth at the grid 3 of tube $V_2$ results in an increased amplitude signal at the anode 4 to thereby further compensate for temperature increases.

Thus, it will be seen that as the ambient temperature of the multivibrator increases prior to the reaching of thermal equilibrium, the resistance of thermistor $R_{11}$ and capacitance of capacitor $C_2$ decrease to provide compensation for the increased resistance of other components of the multivibrator. By the location of the compensating thermistor and capacitor in accordance with the present invention, complete temperature compensation can be achieved. Thus, the present invention is an improvement over prior art systems wherein complete compensation over the entire raster could not be achieved.

A sweep circuit compensated in accordance with the present invention has been found to be extremely stable over reasonably large temperature changes without the necessity of frequent adjustments of the various controls. At the same time, the circuit of the present invention is compatible with the use of high efficiency deflection yokes and serves to minimize power supply requirements by preventing the reduction of scan efficiency.

Although, by necessity, the specific circuit parameters vary in accordance with individual requirements, the following circuit values have been found to be completely satisfactory in one successful embodiment of the invention—

Thermistor: $R_{11}$, 105K.

Resistors: $R_1$, 1.5 megohm; $R_2$, 4 megohm; $R_3$, 15K; $R_4$, 68K; $R_5$, 47K; $R_6$, 1.8 megohm; $R_8$, 500K; $R_9$, 820K; $R_{10}$, 1 megohm.

Capacitors: $C_1$, .018 microfarad; $C_2$, .027 microfarad (temperature dependent); $C_3$, 5,000 micro microfarad; $C_4$, .018 microfarad; $C_5$, .0039 microfarad; $C_6$, 800 micro microfarad; $C_7$, .033 microfarad.

Although the invention has been described with respect to certain specific embodiments, it will be appreciated that modifications and changes may be made by those skilled in the art without departing from the spirit of the invention. Therefore, it is intended by the appended claim to cover all such modifications and changes that fall within the true spirit and scope of the invention.

What is claimed as new and is desired to be secured by Letters Patent of the United States is:

A temperature-compensated multivibrator vertical sweep circuit for a television receiver comprising:

(a) first and second electron discharge devices, each discharge device having a control grid, cathode and plate, (1) the plate of said first discharge device being coupled to the grid of said second discharge device, (b) feedback means connected between the plate of said second discharge device and the grid of said first discharge device, (c) pulse forming means connected between the anode of said first discharge device and a reference potential, (1) said pulse forming means including capacitance means, (d) said pulse-forming means being connected to the grid of said second discharge device to apply a signal thereto, (e) biasing means connected between the grid of said second discharge device and said reference potential, (1) said biasing means including resistance means, (f) said capacitance means and said resistance means exhibiting negative temperature coefficients of capacitance and resistance respectively to respectively increase the amplitude of the signal applied to said grid of said second discharge tube from said pulse forming means increases as temperature increases and to decrease the bias on said grid of said second discharge device as temperature increases.

References Cited by the Examiner

UNITED STATES PATENTS 2,932,766 4/1960 Kraft ---------------- 315—27

FOREIGN PATENTS 233,485 4/1961 Australia.
921,608 3/1963 Great Britain.

ROY LAKE, *Primary Examiner.*

J. B. MULLINS, *Examiner.*